(No Model.)

A. A. RAUBOLD.
APPARATUS FOR OBTAINING MOTIVE POWER FROM RIVER CURRENTS.

No. 500,947. Patented July 4, 1893.

Witnesses:
E. B. Bolton
J. S. Busing

Inventor:
Alfred Artur Raubold
By Richardson
his Attorneys.

United States Patent Office.

ALFRED ARTUR RAUBOLD, OF GREBIN, NEAR PLOEN, GERMANY.

APPARATUS FOR OBTAINING MOTIVE POWER FROM RIVER-CURRENTS.

SPECIFICATION forming part of Letters Patent No. 500,947, dated July 4, 1893.

Application filed June 25, 1892. Serial No. 437,992. (No model.) Patented in Germany January 19, 1892, No. 65,419; in France May 28, 1892, No. 221,964, and in Belgium June 3, 1892, No. 100,005.

*To all whom it may concern:*

Be it known that I, ALFRED ARTUR RAUBOLD, a subject of the Emperor of Germany, residing at Grebin, near Ploen, Prussia, Germany, have invented new and useful Improvements in Apparatus for Obtaining Motive Power from River-Currents, &c.; and I declare the following to be a full, clear, and exact description of the same.

The invention has been patented in Germany, No. 65,419, dated January 19, 1892; in France, No. 221,964, dated May 28, 1892, and in Belgium, No. 100,005, dated June 3, 1892.

The object of the invention is to provide a motor to utilize the power of flowing water and air currents to the greatest possible extent.

Figure 1:
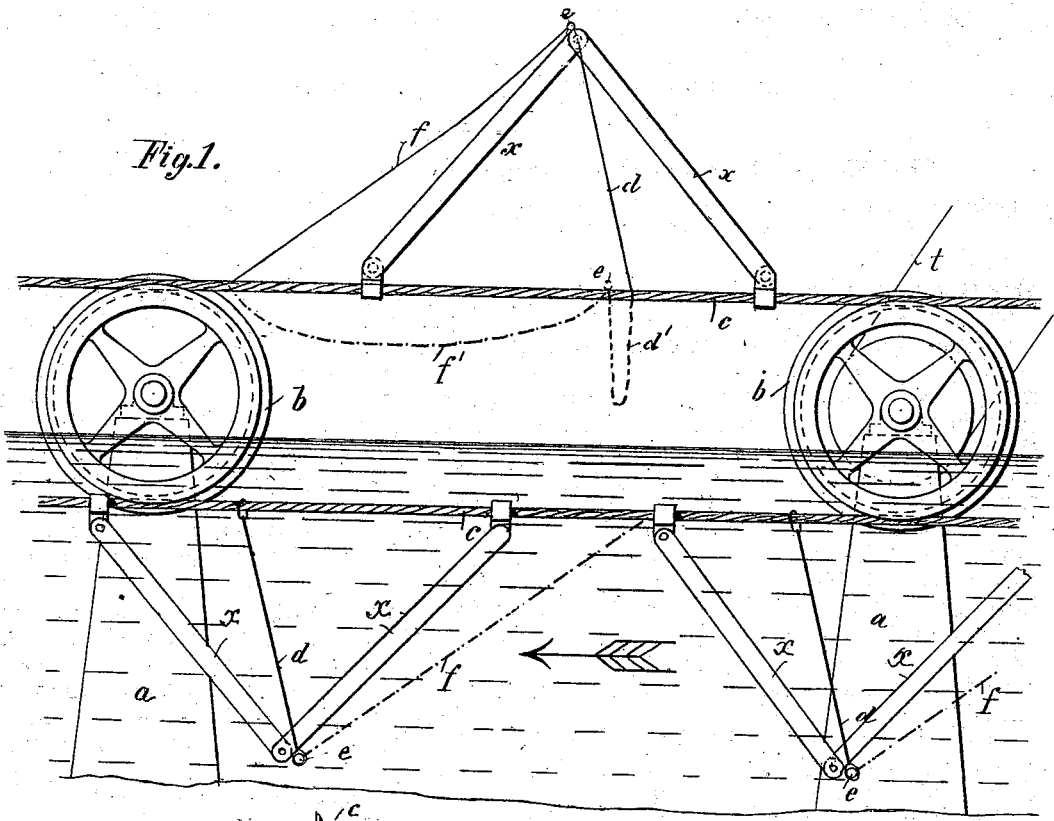
Figure 2:
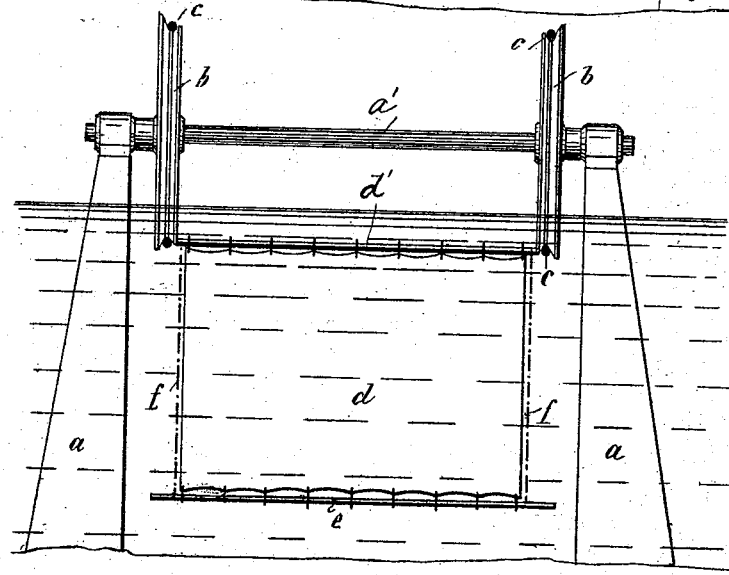

In the accompanying drawings: Figure 1 represents a side elevation of a part of the motor, and Fig. 2, is an end view.

The motor is supported in the stream on pairs of fixed foundations $a$, extending above the level of the stream, and providing journals for the bearings of the lateral shafts $a'$, supporting rope pulleys. Over these pulleys $b$, endless ropes $c$ run in parallel lines and support the blades or paddles $d$, of canvas or other suitable material, connected to cross rods $d'$, which in turn are connected to the ropes. The lower ends are also connected to rods $e$, as shown, which are a little longer than the width of the canvas, for a purpose hereinafter set forth.

The sheets or blades $d$ are held so as to receive the force of the flowing water, by stay ropes $f$, connected to the lower rods $e$, and extending rearwardly to the ropes $c$, as shown. Any number of these sheets or blades may be used, as may be found necessary by the requirements of the work. The power derived may be transmitted to any point desired, in any suitable or well known way. The pulley wheels are flanged, so as to prevent the rope from slipping off. As the sheets or blades reach the end pulley of the device, they pass around it to the upper side and the rod $e$, being longer than the distance between the ropes, serves as supports for the canvas $d$ and ropes $f$, as clearly shown in Fig. 1.

If it be desired to utilize the wind power with the same motor, I provide a supporting frame work of simple construction clamped to the ropes and extending outwardly therefrom, in tent form, as at $x\ x$, the rod $e$ being supported by said frame, when the wind is blowing in opposition to the course of the current, so as hold the canvas sheets $d$, in the position of sails. The stay ropes $f$, may be detachably connected, so that in the case of the use of the motor where there is an ebb and flow, the stay ropes may be extended from first one side and then the other of the sheets $d$.

The operation of the device will be manifest. The sheets $d$ act as blades or paddles, offering a resistance to the flowing water, which forces the sheets along as they are held taut by the stay ropes $f$. This transmits rotary motion to the shafts and pulleys, which may be utilized as desired.

By providing the elongated rope supports or carriers for the sheets, a much better action is secured than in the case of a simple wheel, as the force of the water on each sheet is prolonged.

The dotted lines $f'$—$d'$ Fig. 1, represent the position the ropes and sheets would assume when they are passing rearward over the pulleys in case the frames $x$ were not used.

I claim as my invention—

In combination, the pulleys, the endless ropes the flexible paddles secured thereto, the rods $e$ carried by the lower edges of the said paddles, the stays, $f$ and the frame work $x, x$, clamped to the ropes and serving to support the rods $e$, substantially as described.

In witness whereof I have hereunto set my hand in presence of two witnesses.

ALFRED ARTUR RAUBOLD.

Witnesses:
HEINRICH KRIEDT,
HERMANN WALTER KIND.